O. B. KNAPP.
Wind-Mills.

No. 142,636.   Patented September 9, 1873.

Witnesses:
Inventor:
O. B. Knapp
Per
Attorneys

UNITED STATES PATENT OFFICE.

OVETT B. KNAPP, OF BRANDON, WISCONSIN.

IMPROVEMENT IN WINDMILLS.

Specification forming part of Letters Patent No. 142,636, dated September 9, 1873; application filed March 8, 1873.

*To all whom it may concern:*

Be it known that I, OVETT B. KNAPP, of Brandon, in the county of Fond du Lac and State of Wisconsin, have invented a new and Improved Windmill, of which the following is a specification:

My invention relates to that class of pumping windmills in which an oscillating regulator-vane with automatic apparatus for working it so as to take the wind or not, and another to turn the wheel which has non-adjustable vanes edgewise to the wind for stopping it, are used; and it consists in having the oscillating regulator-vane arranged below the shaft on which it is suspended and around which it oscillates, whereby it is made more sensitive to the effect of the wind, and is controlled better than when pivoted at the middle or above it.

Figure 1:
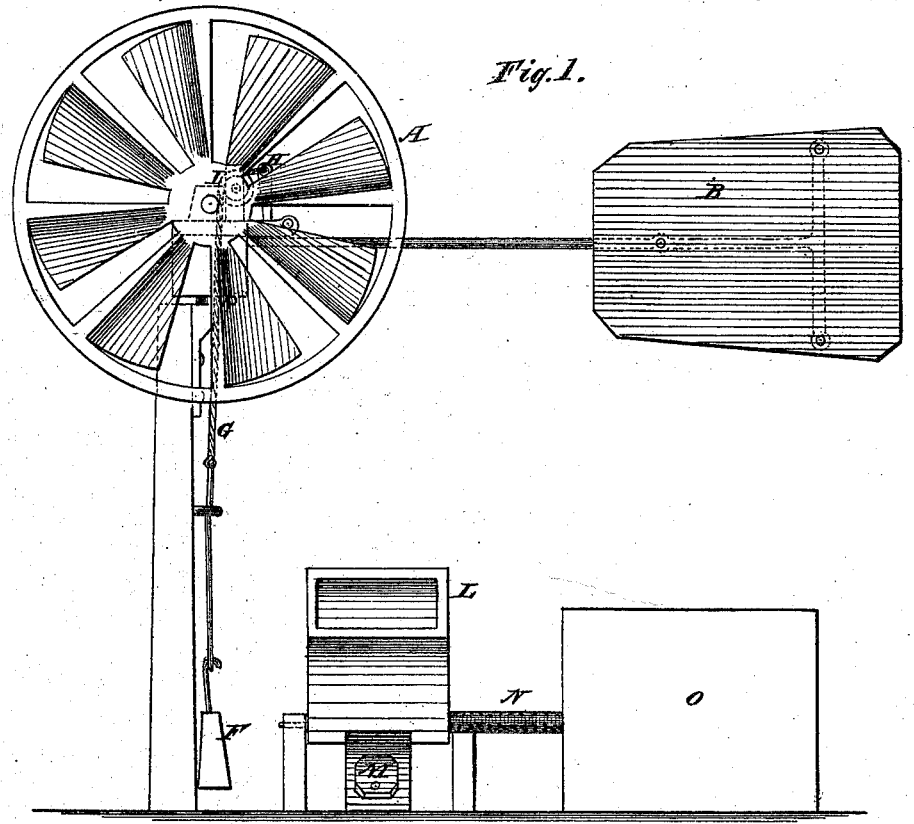
Figure 2:
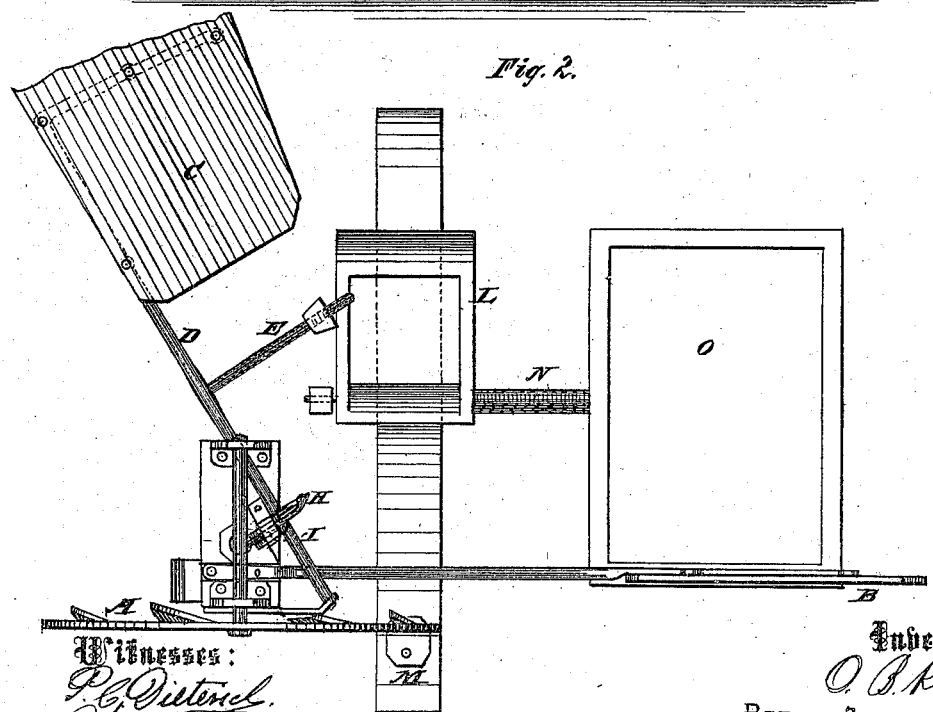

Figure 1 is a side elevation of my improved windmill, and Fig. 2 is a plan view of it.

Similar letters of reference indicate corresponding parts.

A is the wind-wheel, which, like other wheels having non-adjustable vanes, is mounted so as to turn with the wind, and has a vane, B, in its plane, which, when not prevented, turns the wheel edgewise to the wind, so as not to be turned by it. The wheel also has a tail-vane C, of greater capacity than vane B, which causes the wheel to face the wind and be turned by it. This vane is fixed on an oscillating shaft, D, so as to be adjusted to take the wind more or less, according to the power of it, or according to the work to be done; also, to be shifted completely edgewise to the wind, so as to allow the wheel to be shifted edgewise to it by the vane B. The weight of this vane and a weighted arm, E, on the shaft D, turned to hold it in a vertical plane, so as to be acted on by the wind to control the wheel, and a weight, F, suspended from the shaft by a cord, G, arm H, and wheel I, so as to oppose the action of the vane and the weighted arm, unite with the action of the wind on the vane to turn it up to the horizontal plane for lessening its effect on the wheel. The weight is connected to the cord by a hook, so that it can be taken off to let the vane fall and turn the wheel to the wind when it is desired to have the mill run, and it can be hooked on to stop it. The weight of the arms E can be shifted toward or from the shaft, so as to vary its influence on the vane, as may be required. In regard to this part of the apparatus my invention differs from what has heretofore been done, in having the vane C connected to the oscillating shaft at one edge, and in the arrangement of the shaft so that the vane hangs downward from it to take the wind, by which it is in great measure automatically regulated by the wind, according to the strength of it, for as its weight tends to bring it to that position in which it takes the wind the most, and the tendency of the wind is to move it back again, it will of course vary with the power of the wind, and will turn as the wind increases and take less of it; whereas a vane pivoted at the center will be acted on alike upon each side, and will have to be shifted entirely by the automatic apparatus.

Having thus described my invention, I claim as new and desire to secure by Letters Patent—

In a windmill having a wheel with fixed vanes, a fixed vane for shifting it edgewise to the wind, and an oscillating regulating-vane, the said regulating-vane arranged on an oscillating shaft, as herein specified.

OVETT B. KNAPP.

Witnesses:
A. J. YORTY,
E. H. YORTY.